(12) United States Patent
Goto et al.

(10) Patent No.: US 8,192,020 B2
(45) Date of Patent: *Jun. 5, 2012

(54) TILTED-WEAR TYPE CONTACT LENS

(75) Inventors: Yuji Goto, Komaki (JP); Yukihisa Sakai, Toyohashi (JP); Hiroyuki Yamaguchi, Tajimi (JP)

(73) Assignee: Menicon Co., Ltd., Nagoya (JP)

( * ) Notice: Subject to any disclaimer, the term of this patent is extended or adjusted under 35 U.S.C. 154(b) by 8 days.

This patent is subject to a terminal disclaimer.

(21) Appl. No.: 12/863,458

(22) PCT Filed: Jan. 24, 2008

(86) PCT No.: PCT/JP2008/000084
§ 371 (c)(1),
(2), (4) Date: Jul. 19, 2010

(87) PCT Pub. No.: WO2009/093286
PCT Pub. Date: Jul. 30, 2009

(65) Prior Publication Data
US 2010/0296050 A1  Nov. 25, 2010

(51) Int. Cl.
*G02C 7/06* (2006.01)
(52) U.S. Cl. ........................................ 351/161
(58) Field of Classification Search ............... 351/160 R, 351/161
See application file for complete search history.

(56) References Cited

U.S. PATENT DOCUMENTS

| | | |
|---|---|---|
| 4,268,133 A | 5/1981 | Fischer et al. |
| 4,618,228 A | 10/1986 | Baron et al. |
| 5,151,723 A | 9/1992 | Tajiri |
| 5,296,881 A | 3/1994 | Freeman |
| 5,422,687 A | 6/1995 | Tanaka et al. |
| 6,142,625 A | 11/2000 | Sawano et al. |
| 6,896,368 B2 | 5/2005 | Baugh |
| 7,976,156 B2 * | 7/2011 | Goto et al. ............ 351/161 |

FOREIGN PATENT DOCUMENTS

| | | |
|---|---|---|
| EP | 0 201 231 A2 | 11/1986 |
| JP | A-61-272717 | 12/1986 |
| JP | A-2-79015 | 3/1990 |
| JP | A-6-289329 | 10/1994 |
| JP | A-8-262377 | 10/1996 |
| JP | A-11-174388 | 7/1999 |

OTHER PUBLICATIONS

Search Report dated Mar. 11, 2008 issued in International Patent Application No. PCT/JP2008/000084 (with translation).
Dec. 28, 2010 Office Action issued in U.S. Appl. No. 12/824,623.
Apr. 4, 2011 Notice of Allowance issued in U.S. Appl. No. 12/824,623.

* cited by examiner

*Primary Examiner* — Darryl J Collins
(74) *Attorney, Agent, or Firm* — Oliff & Berridge, PLC

(57) ABSTRACT

A contact lens including a circumferential positioning member that can selectively set up a first stable state where a superficial center of a second power zone is decentered on a symmetrical meridian from a geometrical center of an optical zone and an orthogonal meridian perpendicular to the symmetrical meridian with the lens worn on a right eye is circumferentially tilted by a first angle relative to a vertical line of the eye, and a second stable state where the orthogonal meridian under condition in which the lens is worn on a left eye with the right eye wearing state inverted upside down is circumferentially tilted by a second angle on the opposite side of the first angle relative to the vertical line, as well as a visible indicator mark for identifying a lens orientation.

12 Claims, 7 Drawing Sheets

TILTED-WEAR TYPE CONTACT LENS

TECHNICAL FIELD

The present invention relates generally to contact lens, and in particular to a multifocal contact lens having a plurality of diopter power regions.

BACKGROUND ART

For the purpose of correcting presbyopia for example, it is widely known to prescribe multifocal contact lenses, such as bifocal lenses having multiple diopter power regions, and specifically a distance region provided as a first diopter power region and a near region provided as a second diopter power region having more positive additional diopter power than that of the distance region.

As one multifocal contact lens of this kind, the multifocal contact lens disclosed for example in Patent Document 1 (JP-A 61-272717) has a distance region and a near region formed with concentric circular shape centered on the geometric center of the lens. However, it is known that the center of the pupil is biased slightly towards the nasal side from the center of the cornea. For this reason, it is difficult for contact lenses with a shape like that disclosed in Patent Document 1, in which the distance region and the near region are formed with concentric circular shapes from the geometric center of the lens on the assumption that the lens geometric center is aligned with the center of the pupil, to maintain the desired positional relationship between the pupil and the two regions during actual wear. As a result, neither distance vision nor near vision was corrected effectively.

In view of this, the Applicant proposed in Patent Document 2 (JP-A 6-289329), a multifocal contact lens in which the near region is biased towards the nasal side from the lens geometric center. This successfully reflects the fact that, in the case of near vision, the axis of vision lies closer towards the nasal side, making it possible to provide effective correction of both near vision and distance vision owing to the resultant aligning of the lens optical axis with the axis of vision.

However, with a multifocal contact lens such as that disclosed in Patent Document 2, due to the fact that for some wearers the near region is biased not only in the horizontal direction but also in the vertical direction, it was necessary to provide separate lenses for the right eye and for the left eye. This requires additional specifications for left and right. For this reason, in the case of a made-to-stock production system, it would be necessary to have extensive inventory available, potentially leading to both increased production costs and administrative costs. Also, left and right lenses need to be handled separately, even for wearers having the same specifications for both the left and right eye.

Patent Document 1: JP-A 61-272717
Patent Document 2: JP-A 6-289329

DISCLOSURE OF THE INVENTION

Problem the Invention is Intended to Solve

With the foregoing in view, it is accordingly an object of the present invention to provide a contact lens of novel structure affording lower necessary costs such as production costs and administrative costs, as well as improving the ease of handling for the wearer.

Means for Solving the Problem

The above objects of this invention may be attained according to at least one of the following modes of the invention. The following modes may be adopted at any possible optional combinations.

A first mode of the present invention provides a tilted-wear type contact lens comprising an optical zone situated in a lens center section, and provided with a first diopter power region and a second diopter power region having a lens diopter power that is more positive than that of the first diopter power region, characterized in that: the contact lens has a lens profile that is axisymmetric with respect to a symmetrical meridian defined by one diametrical line of the optical zone; a superficial center of at least one of the first diopter power region and the second diopter power region is decentered on the symmetrical meridian against a geometric center of the optical zone; a circumferential positioning member is provided to afford stable positions in a lens circumferential direction when worn in an eye, an orthogonal meridian that is orthogonal to the symmetrical meridian is tilted by a prescribed angle with respect a vertical line of the eye; the circumferential positioning member is adapted to give rise to a first stable state in which, with the lens placed in a right eye, the orthogonal meridian is tilted by a first tilt angle in the circumferential direction relative to the vertical line of the eye, and to a second stable state in which, with the lens placed in a left eye with an orientation thereof flipped vertically from that when worn in the right eye, the orthogonal meridian is tilted relative to the vertical line of the eye by a second tilt angle to an opposite side in the circumferential direction from the first tilt angle; and a visible indicator mark is provided for identifying normal position and flipped position in relation to the orientation in a lens vertical direction.

The tilted-wear type contact lens constructed according to the present mode can be positioned with the first diopter power region or the second diopter power region, which are approximately symmetric to either side of the wearer's nose, decentered with respect to the pupil center. For example, if the second diopter power region has been positioned so as to lie towards the nose of the wearer with the lens in the first stable state while worn in the right eye, the second diopter power region will be positioned towards the nose of the wearer with the lens in the second stable state when worn in the left eye as well. In the present mode, the lens diopter power of the second diopter power region that is more positive than that of the first diopter power region refers to greater diopter power towards the plus end. As a specific example, if the first diopter power region were −5 D, +1 D, 0 D, and −3 D would all have greater power towards the plus end.

For instance, in the case where the tilted-wear type contact lens according to the present invention is designed as a bifocal lens for correcting presbyopia in which the first diopter power region serves as the distance optical zone and the second diopter power region serves as the near optical zone, through appropriate adjustments of the first tilt angle and the second tilt angle, the near optical zone can be positioned towards the lower side of the nose of the wearer regardless of whether the lens is worn in the left or right eye. Thus, with the tilted-wear type contact lens according to the present invention, it is possible for the lens to be stably positioned in a corresponding optimal stable state, regardless of whether it is worn in the left or right eye. As a result, it is possible for a single lens to be used in common for both the left eye and the right eye, making it unnecessary to provide separate left and right lenses. Thus, where the lenses are provided through a made-to-stock production system for example, the level of inventory required conventionally can be halved, and the costs entailed in both production and administration can be reduced.

Additionally, while it is not essential that tilted-wear type contact lens constructed according to the present invention be provided as a left/right set, providing the lenses in a left/right set affords better advantages. Specifically, by providing the wearer with a set composed of a pair of tilted-wear type contact lenses of identical specification that afford vision correction to the right eye when worn in the first stable state and that afford vision correction to the left eye when worn in the second stable state, the wearer obtains optimal correction for the right eye when worn in the right eye and optimal correction for the left eye when worn in the left eye, regardless of which lens of the pair is worn. It is accordingly possible to correct both the left and right eyes with a pair of lenses of the same specification, and a wearer having identical left and right prescriptions can handle the lenses without paying attention to left versus right distinctions, thus affording improved ease of use.

In the tilted-wear type contact lens constructed according to the present invention, in order to attain the two stable states, i.e. the first stable state and the second stable state, the wearer needs to pay attention to circumferential positioning of the lens for wear so that it becomes positioned stably in the first stable state when worn in the right eye, and in the second stable state when worn in the left eye. For this reason, according to the tilted-wear type contact lens of the present invention, an indicator mark is provided so that circumferential positioning of the lens may be readily discerned, facilitating wear of the lens in the desired stable state.

A second mode of the present invention provides the tilted-wear type contact lens according to the first mode, wherein further comprises a peripheral zone disposed to an outer peripheral side of the optical zone, wherein the circumferential positioning member comprises two slab-off zones provided on respective portions of the peripheral zone located at opposite sides of the optical zone in a direction of the orthogonal meridian, the two slab-off zones are made thinner than portions located at opposite sides of the optical zone in a direction of the symmetrical meridian, and the two slab-off zones are axisymmetric with respect to the symmetrical meridian and non-axisymmetric with respect to the orthogonal meridian.

In the tilted-wear type contact lens constructed according to the present mode, by employing slab off of non-axisymmetric shape in relation to the orthogonal meridian, a stable state with the orthogonal meridian tilted with respect to the vertical line of the eye can be consistently achieved. Also, by virtue of a double slab off design that is thinner to either side of the optical zone in the direction of the orthogonal meridian, it is possible to stably position the lens in either of two stable states inverted top to bottom.

A third mode of the present invention provides the tilted-wear type contact lens according to the second mode wherein a pair of thicker portions of mutually different circumferential length are provided between two circumferential end portions of a pair of thinner portions reduced in thickness by the two slab-off zones, and are located at opposite sides of the optical zone in the direction of the symmetrical meridian.

In the tilted-wear type contact lens constructed according to the present mode, a differential is created to either side of the optical zone in the symmetrical meridian direction in terms of the weight balance and of acting force resulting from contact with the eyelid. First and second stable states in which the orthogonal meridian is tilted with respect to the vertical line can be advantageously achieved thereby.

A fourth mode of the present invention provides the tilted-wear type contact lens according to any of the first to third modes further comprising a peripheral zone disposed to the outer peripheral side of the optical zone, wherein the circumferential positioning member is provided in the peripheral zone such that a portion situated to one side of the optical zone in the direction of the symmetrical meridian is thicker in comparison with a portion situated to another side.

In the tilted-wear type contact lens constructed according to the present mode, a ballast effect is created by the difference of weight balance in the symmetrical meridian direction. First and second stable states in which the orthogonal meridian is tilted with respect to the vertical line can be advantageously achieved thereby.

A fifth mode of the present invention provides the tilted-wear type contact lens according to any of the first to fourth modes further comprising a peripheral zone disposed to the outer peripheral side of the optical zone, wherein the indicator mark is provided on the peripheral zone by at least one of dyeing and engraving. The tilted-wear type contact lens constructed according to the present mode is provided with an indicator mark in the peripheral zone away from the optical zone, thereby preventing the indicator mark from affecting the optical characteristics. Thus, satisfactory optical characteristics are achieved in both the first and second stable states.

A sixth mode of the present invention provides the tilted-wear type contact lens according to any of the first to fifth modes wherein the geometric center of the optical zone is coincident with a lens geometric center. According to this mode, deviation of the optical zone from the pupil can be avoided both in the first and second stable states, so that stable optical characteristics are achieved.

A seventh mode of the present invention provides the tilted-wear type contact lens according to any of the first to sixth modes wherein the superficial center of at least one of the first diopter power region and the second diopter power region is decentered from the geometric center of the optical zone by a distance of 0.4 mm or greater on the symmetrical meridian.

In the tilted-wear type contact lens constructed according to the present mode, the relative position of the first or second diopter power region with respect to the geometric center of the optical zone differs unambiguously between the first and second stable states. Specifically, if this decentered distance is smaller than 0.4 mm, the relative position of the first or second diopter power region with respect to the geometric center of the optical zone is observed to change negligibly between the first stable state and the second stable state, making it difficult to attain the respective optical characteristics reflective of the two stable states.

An eighth mode of the present invention provides the tilted-wear type contact lens according to any of the first to seventh modes wherein, on a lens posterior surface adapted to be superposed on a cornea, a peripheral zone is disposed to an outer peripheral side of the optical zone, and an outside diameter dimension of the optical zone does not exceed 75% of an outside diameter dimension of the lens.

The tilted-wear type contact lens constructed according to the present mode is able to consistently assume both the first stable state and the second stable state. Specifically, if the outside diameter dimension of the optical zone is greater than 75% of the lens outside diameter dimension, during wear the lens geometric center tends to stabilize at a fixed position on the cornea surface, and there is a risk of it becoming difficult for the lens to consistently assume the two stable states, i.e. the first stable state and the second stable state.

As a specific example, a ninth mode of the present invention provides the tilted-wear type contact lens according to the eighth mode wherein the lens is a soft contact lens; and the outside diameter dimension of the optical zone of the lens posterior surface is 10 mm or less.

A tenth mode of the present invention provides the tilted-wear type contact lens according to any of the first to ninth modes wherein a power-added surface that imparts an additional lens diopter power to the second diopter power region of the optical zone is provided on a lens posterior surface adapted to be superposed on a cornea during wear.

With the tilted-wear type contact lens constructed according to the present mode, due to a difference in curvature between the first diopter power region and the second diopter power region, lacrimal fluid can be retained between the cornea surface and the lens posterior surface. By utilizing the retained lacrimal fluid as a lacrimal lens, abrupt change in optical characteristics between the first diopter power region and the second diopter power region can be mitigated. Also, by using a forming die to shape the profile of the lens posterior surface having multiple curvature ratios that differ for the first diopter power region and the second diopter power region, excellent manufacturing efficiency may be achieved.

An eleventh mode of the present invention provides a tilted-wear type contact lens according to any of the second to tenth modes wherein the lens is a soft contact lens, and the two slab-off zones are provided on a lens posterior surface adapted to be superposed on a cornea during wear.

With the tilted-wear type contact lens constructed according to the present mode, through deformation of the lens to conform with the cornea surface when worn against the eyeball, the double slab off formed on the lens posterior surface appears on the lens anterior surface. Thus, the lens can be positioned in the first stable state and the second stable state through interaction with the eyelid. The present mode is preferably employed in conjunction with the preceding tenth mode. Specifically, by forming the add power face and the thinned face on the lens posterior surface, it is possible to use a forming die to form the complex profile of the lens posterior surface, and excellent manufacturing efficiency may be achieved.

A twelfth mode of the present invention provides the tilted-wear type contact lens according to any of the first to eleventh modes wherein the circumferential positioning member is adapted to selectively set up a normal orientation in which the lens is worn in either of the first stable state and the second stable state, and a reversed orientation in which the first diopter power region and the second diopter power region that are respectively positioned to either of left and right sides of the eye in the normal orientation are instead positioned oppositely to another of left and right sides of the eye, respectively.

The tilted-wear type contact lens constructed according to the present mode can be worn selectively in normal orientation with the first diopter power region positioned towards the temporal side, or in reversed orientation with the first diopter power region positioned towards the nasal side for example.

Consequently, if for example the tilted-wear type contact lens according to the present invention is designed as a bifocal lens for correcting presbyopia in which the first diopter power region serves as the distance optical zone and the second diopter power region serves as the near optical zone, for a given eye, the lens can be worn selectively either in normal orientation with the near optical zone positioned towards the nasal side, or in reversed orientation with the near optical zone positioned towards the ear side. Thus, if worn in the normal orientation, the near optical zone is positioned towards the nose of the wearer close to the center of the pupil, so that correction of distance vision and near vision is possible. If worn in the reversed orientation on the other hand, the near optical zone is positioned towards the ear side away from the center of the pupil, thereby affording good distance vision with reduced incidence of flare and the like. Specifically, according to the present mode, by changing the wear orientation, it is possible to achieve at least one of: (1) change of the power of the lens optical face at the pupil center (preferably a power change of 0.25 D or greater); (2) change of positioning of the power of the lens optical zone on the pupil; and (3) change of the projected surface area ratio of the near optical zone and the distance optical zone on the pupil (preferably a change of projected surface area ratio of 10% or more). It is possible thereby to obtain bifocal effect through wear in the normal orientation, and to obtain generally monofocal effect through wear in the reversed orientation, and to effectively produce the different optical characteristics of either.

Additionally, while it is not essential that the tilted-wear type contact lens constructed according to the present mode be provided as a left/right set, providing the lenses in a left/right set affords better advantages. Specifically, the wearer may use the respective left and right lenses in selective combinations of normal orientation and reversed orientation depending on the usage environment, whereby, in the case of the aforementioned bifocal lenses for example, both left and right lenses can be worn in the normal orientation to obtain bifocal effect from both lenses; or both left and right lenses can be worn in the reversed orientation to obtain generally monofocal effect from both lenses. The correction balance of distance vision and near vision may also be varied according to the usage environment, for example, by employing normal orientation for the dominant eye and reversed orientation for the non-dominant eye, or reversed orientation for the dominant eye and normal orientation for the non-dominant eye. By so doing the lenses can be used effectively for modified monovision prescriptions as well.

Through these combinations of normal and reversed orientation for left and right, the tilted-wear type contact lens of the present mode reduces the time and effort required to habituate the wearer of bifocal lenses, for example. As a specific example, by establishing the first diopter power region as the distance optical zone and the second diopter power region as the near optical zone, and determining the distance power with the lenses in both eyes worn in reversed orientation in which the near optical zone is positioned towards the ear side, a prescription for contact lenses for distance vision correction may be successfully accomplished. With regard to near power, by providing tilted-wear type contact lenses constructed according to the present mode in a series having a given distance power and lens diopter power of the near optical zone that differs in small increments between lenses, and intended to be worn in the normal orientation with the near optical zone positioned towards the nasal side, by varying the near power gradually over periods ranging from several days to several months in the living environment to adequately habituate the wearer, it is possible to determine or establish an optimum level for near power.

KEYS TO SYMBOLS

| | |
|---|---|
| 10 | contact lens |
| 12 | lens geometric center axis |
| 14 | optical zone |
| 16 | peripheral zone |
| 20 | optical zone geometric center axis |
| 22 | symmetrical meridian |
| 24 | near optical zone |
| 26 | distance optical zone |
| 30 | near zone superficial center |
| 32 | distance zone superficial center |
| 34 | orthogonal meridian |
| 40 | slab-off zone |
| 42 | slab-off zone |
| 44 | thicker portion |
| 46 | thicker portion |
| 48 | indicator mark |

BEST MODE FOR CARRYING OUT THE INVENTION

A fuller understanding of the present invention will be obtained upon consideration of the following detailed description of the embodiments of the invention with reference to the accompanying drawings.

Figure 1:
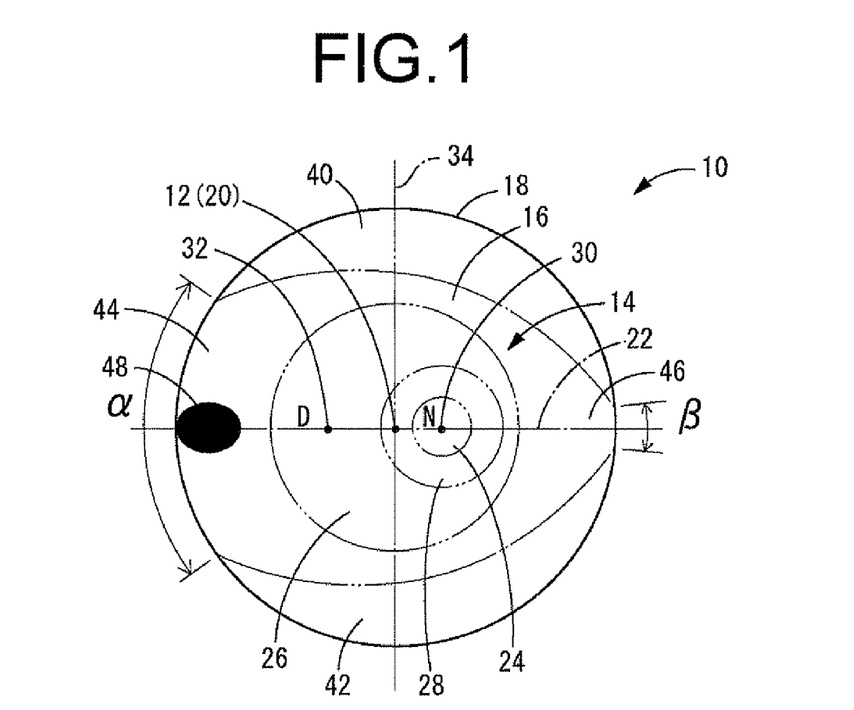
FIG. 1 is a front view of a contact lens according to a first embodiment of the present invention.

First, FIG. 1 depicts a contact lens 10 as a tilted-wear type contact lens according to a first embodiment of the present invention. The contact lens 10 is approximately spherical shell shaped overall having the profile of a solid of revolution defined by rotation about a lens geometric center axis 12 in front view as depicted in FIG. 1. The lens is intended to be used worn superposed on the surface of the cornea of the eyeball. In FIG. 1 and in FIGS. 3 to 10 to be discussed later, the symbols "N" and "D" are shown for convenience so that the respective positions of the near optical zone and the distance optical zone may be easily ascertained.

The contact lens 10 of the present embodiment is a contact lens of soft type. No particular limitation is imposed as to the material, which may be a conventional known hydrated material such as PHEMA (polyhydroxyethyl methacrylate) or PVP (polyvinyl pyrrolidone), or a non-hydrated material such as acrylic rubber or silicone.

The contact lens 10 is a simultaneous vision corrective lens for presbyopia. In the lens front view illustrated in the drawing, an optical zone 14 that functions as the corrective optical system is formed with large circular shape extending on the lens geometric center axis 12. In the outside peripheral portion of the lens, a peripheral zone 16 provided as a non-optical region encircling the optical zone 14 is formed on the lens geometric center axis 12, with annular band shape of prescribed width. At the outside peripheral edge of the lens, an edge portion 18 that smoothly connects the front and rear surfaces of the contact lens 10 is formed with annular shape along the entire circumference.

Here, an optical zone geometric center axis 20 of the optical zone 14 is coincident with the lens geometric center axis 12. Also, the outside diameter dimension of the optical zone 14 at the lens posterior surface is 75% or less than the lens outside diameter dimension. Specifically, it is preferably 10 mmϕ or smaller, which is equal to or smaller than the standard human corneal diameter. The reason is that if the outside diameter dimension of the optical zone 14 is greater than 75% of the lens outside diameter dimension, the lens tends to stabilize at a fixed position, making it difficult for the lens to assume the two stable states, i.e. the first stable state and the second stable state discussed later.

Additionally, the optical zone 14 is composed of optical regions having three different focal lengths. Firstly, a small circular region the superficial center of which is positioned decentered from the optical zone geometric center axis 20 on a symmetrical meridian 22 defined by one diametrical line through the optical zone 14 constitutes a near optical zone 24 for which a given focal length (i.e. lens diopter power) is established to aid near vision. The outermost peripheral region encircling the near optical zone 24 in the optical zone 14 constitutes a distance optical zone 26 for which a given focal length (lens diopter power) is established to aid distance vision. Additionally, a region of annular band shape between the near optical zone 24 and the distance optical zone 26 constitutes a transition zone 28.

The near optical zone 24 has a lens face in which the lens diopter power of the distance optical zone 26 has an additional prescribed add power for the purpose of near vision. Thus, the lens diopter power (diopter) of the near optical zone 24 is greater towards the plus end in comparison with the lens diopter power (diopter) of the distance optical zone 26; in the present embodiment, the distance optical zone 26 constitutes the first diopter power region, while the near optical zone 24 constitutes the second diopter power region. In the transition zone 28, there is established a focal distance (lens diopter power) that changes progressively in the diametrical direction from the lens diopter power of the near optical zone 24 to the lens diopter power of the distance optical zone 26. Alternatively, a given focal distance (lens diopter power) lying between that of the near optical zone 24 and that of the distance optical zone 26 may be established in the transition zone 28.

A near zone superficial center 30, which represents the superficial center of the near optical zone 24, is positioned decentered with respect to the optical zone geometric center axis 20, on the symmetrical meridian 22 of the optical zone 14. The decenter distance of the near zone superficial center 30 with respect to the optical zone geometric center axis 20 is preferably 0.4 mm or greater, more preferably 0.6 mm or greater, in the component thereof in the symmetrical meridian 22 direction. The reason is that if the decenter distance of the near zone superficial center 30 is less than 0.4 mm, it becomes difficult to produce a differential in terms of the relative position of the near optical zone 24 with respect to the pupil, between the first stable state and the second stable state discussed later; it also becomes difficult to position the near optical zone 24 towards the lower nasal side. Meanwhile, a distance zone superficial center 32, which represents the superficial center of the distance optical zone 26, is positioned on the symmetrical meridian 22 decentered towards the opposite side of the optical zone geometric center axis 20 from the near zone superficial center 30. The optical zone 14 is thereby imparted with symmetrical shape in relation to the symmetrical meridian 22, and with asymmetrical shape in relation to an orthogonal meridian 34 that is orthogonal to the symmetrical meridian 22 on the lens geometric center axis 12.

Furthermore, the add power face that imparts added lens strength to the near optical zone 24 is formed on the lens posterior surface that is superposed on the cornea during wear. In the optical zone 14 of the present embodiment, a convex approximately arcuate cross zone for imparting lens diopter power of the near optical zone 24 and the distance optical zone 26 in cooperation with a lens anterior surface 36 (see FIG. 2) of convex, approximately arcuate cross zone having an approximately constant curvature radius is formed on a lens posterior surface 38 (see FIG. 2). The contact lens 10 of the present embodiment is thereby able to retain lacrimal fluid between the cornea surface and the lens posterior surface 38 during wear on the eyeball, and the lacrimal lens formed by this lacrimal fluid mitigates abrupt change in lens diopter power between the near optical zone 24 and the distance optical zone 26.

In the peripheral zone 16, a pair of slab-off zones 40, 42 provided as thin portions that are thinner in comparison with the zones located at opposite sides of the optical zone 14 in the direction of the symmetrical meridian 22 are formed to either side of the optical zone 14 along the direction of the orthogonal meridian 34, with these two slab-off zones 40, 42 forming a double slab off structure. In the present embodiment in particular, the two slab-off zones 40, 42 are symmetric in shape in relation to the symmetrical meridian 22 but asymmetric in shape in relation to the orthogonal meridian 34, so that in front view they appear to have sloping shape, one circumferential edge of which is closer to the symmetrical meridian 22 than the other.

Figure 2:
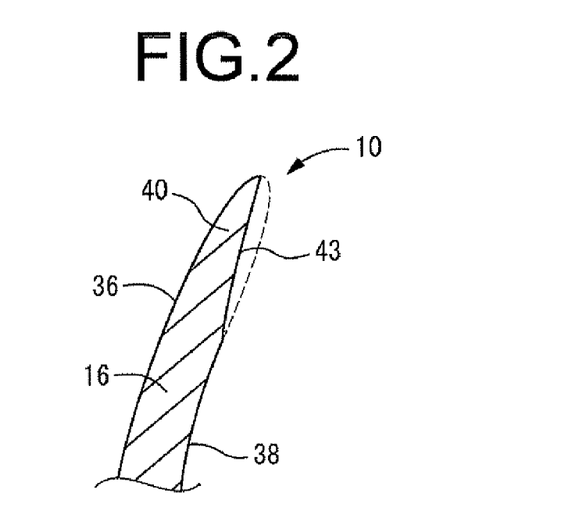
FIG. 2 is a model depiction of a fragmentary cross section of the contact lens in a direction of the orthogonal meridian.

In the present embodiment in particular, as in the exemplary slab-off zone 40 depicted in model form in FIG. 2, a thinned face 43 that provides the two slab-off zones 40, 42 is established on the lens posterior surface 38. When the contact lens 10 is being worn, the lens experiences deformation so as to conform to the cornea surface, thus causing the thinned contours established on the lens posterior surface 38 to appear on the lens anterior surface 36.

At locations between the circumferential ends of the slab-off zones 40, 42 to either side of the optical zone 14 in the direction of the symmetrical meridian 22 there are formed a pair of thicker portions 44, 46 that are thicker in comparison with the slab-off zones 40, 42. These thicker portions 44, 46 differ from one another in terms of their circumferential length direction. In other words, the center angle: $\alpha$ of one thicker portion 44 about the lens geometric center axis 12 between the circumferential ends differs from the center angle: $\beta$ of the other thicker portion 46 about the lens geometric center axis 12 between the circumferential ends. In preferred practice, the differential between the center angle: $\alpha$ of the thicker portion 44 and the center angle: $\beta$ of the thicker portion 46 is between 5 and 50 degrees, more preferably between 10 and 40 degrees, about the lens geometric center axis 12. If the difference between the center angles: $\alpha, \beta$ is less than 5 degrees, the weight balance of the two thicker portions 44, 46 and the acting force exerted on the two thicker portions 44, 46 by the eyelid are in approximate equilibrium between the two thicker portions 44, 46, making it difficult to stabilize the lens with the orthogonal meridian 34 tilted as described later; whereas if the difference between the center angles: $\alpha, \beta$ is greater than 50 degrees, the ballast effect produced by the thicker portion 44, 46 that has greater circumferential length will predominate, causing the lens to stabilize at a fixed circumferential position and making it difficult for the lens to assume the two stable states, i.e. the first stable state and the second stable state discussed later. The circumferential length dimensions of the thicker portions 44, 46 may be established appropriately in consideration of factors such as the lens tilt angle required.

The contact lens 10 of the present embodiment as a whole, inclusive of the optical zone 14 and the peripheral zone 16, is thereby axisymmetric in shape in relation to the symmetrical meridian 22; but is non-axisymmetric in shape in relation to the orthogonal meridian 34, due to the near optical zone 24 being positioned decentered from the lens geometric center axis 12, and to the sloping shape of the two slab-off zones 40, 42.

A visible indicator mark 48 is provided at a suitable location in the circumferential direction of the peripheral zone 16. The indicator mark 48 is provided for visual identification of the circumferential orientation of the contact lens 10, and in preferred practice is formed at the lens outside edge on the symmetrical meridian 22 or on the orthogonal meridian 34. In the present embodiment in particular, the indicator mark 48 is elliptical in shape with the long axis extending along the symmetrical meridian 22, and is formed at the lens outside edge on the opposite side of the lens geometric center axis 12 from the near optical zone 24. The indicator mark 48 may be produced by conventional known methods, with dyeing or engraving being preferred. No particular limitation is imposed as to the appearance of the indicator mark 48, and various different designs or alphanumeric characters could be employed appropriately.

Figure 3:
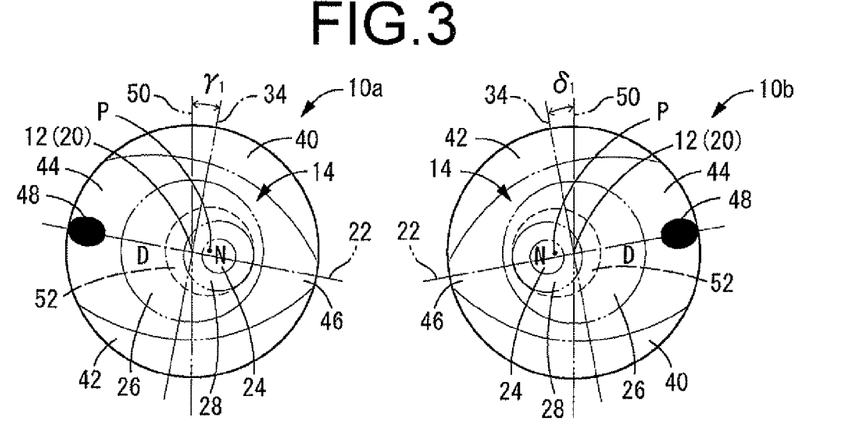
FIG. 3 is an illustration depicting one example of wearing combination of these contact lenses.

FIG. 3 depicts the contact lens 10 of the present embodiment worn in the left and right eyes. In FIG. 3 and in FIGS. 4 and 5 discussed later, the contact lens 10 of the present embodiment is depicted in front view in model form worn in the both the left and right eyes respectively; the lens worn in the right eye (the left side in the drawing) is denoted as contact lens 10*a*, while the lens worn in the left eye (the right side in the drawing) is denoted as contact lens 10*b*.

In the contact lens 10 according to the present embodiment, because the two slab-off zones 40, 42 are asymmetric in shape in relation to the orthogonal meridian 34, and the thicker portions 44, 46 differ in their circumferential length, the weight balance and interaction with the eyelid are unequal between the left and right sides of the orthogonal meridian 34. As a result, when the lens is placed on the eyeball, the orthogonal meridian 34 becomes stably positioned at a circumferential position tilted by a prescribed angle about the lens geometric center axis 12 with respect to a vertical line 50 of the eye. Thus, when the contact lens 10*a* is placed in the right eye with the indicator mark 48 positioned towards the ear side, it becomes stably positioned at a circumferential position in which the orthogonal meridian 34 is tilted clockwise about the lens geometric center axis 12 by a first tilt angle: $\gamma_1$ with respect to the vertical line 50 of the eye, with this position constituting the first stable state. On the other hand, when the contact lens 10*b* is inverted top to bottom relative to its orientation when worn in the right eye and placed in the left eye with the indicator mark 48 positioned towards the ear side, it becomes stably positioned at a circumferential position in which the orthogonal meridian 34 is tilted counterclockwise about the lens geometric center axis 12 by a second tilt angle: $\delta_1$ with respect to the vertical line 50 of the eye, with this position constituting the second stable state. In this way, in the present embodiment the two slab-off zones 40, 42 and the thicker portions 44, 46 constitute the circumferential positioning member. The first tilt angle: $\gamma_1$ and the second tilt angle: $\delta_1$ may be the same or different from each other.

According to the contact lens 10 of the present embodiment, the superficial center of the near optical zone 24 is positioned decentered from the optical zone geometric center axis 20, and thus for both the contact lens 10a that is worn in the first stable state in the right eye and the contact lens 10b that is worn in the second stable state in the left eye, the near optical zone 24 will be positioned towards the nasal side and overlapping the pupil 52. It is possible thereby to position the near optical zone 24 close to the center: P of the pupil 52 to successfully compensate for the fact that the pupil center is biased towards the nasal side during near vision. A bifocal effect having good balance of distance vision and near vision can be achieved as a result. Additionally, it is known that the pupil center is biased towards the nasal side and slightly downward during near vision. According to the present embodiment in particular, it is possible to stably position the near optical zone 24 towards the nasal side and slightly downward through tilting of the lens, making it possible to stably position the near optical zone 24 at a position corresponding more closely to the pupil 52.

With the lens worn in the right eye in the first stable state and in the left eye in the second stable state, in both the left and right eyes the thicker portion 44, which has a large circumferential dimension and is readily exposed to pushing action by the eyelid, is positioned towards the ear side. Thus, the force produced by pushing action of the eyelid acts on the contact lens 10a, 10b in the direction towards the ear side; and because the sclera becomes more extensive towards the ear side from the cornea, bias of the contact lens 10 towards the ear side as a result of this force is more readily permitted, so the contact lenses 10a, 10b worn in both the left and right eyes respectively become slightly biased toward the ear side. As a result, the near optical zone 24 can be stably positioned at position corresponding more closely to the pupil 52.

In order to consistently give rise to the first stable state and the second stable state, it is preferable to place the contact lens 10 on the eyeball at a circumferential position with the near optical zone 24 prepositioned towards the nasal side. This requires the wearer to ascertain the position of the near optical zone 24. According to the present embodiment, because the indicator mark 48 is formed to the opposite side in the direction of the symmetrical meridian 22 from the near optical zone 24, if for example the orientation of the lens in the vertical direction when worn in the first stable state in the right eye is designated as a normal position, it is possible to distinguish between the normal position in which the lens is oriented in the lens vertical direction so that the indicator mark 48 is positioned to the left side in plan view, and a reversed position in which the lens is inverted top to bottom relative to the normal position and oriented in the lens vertical direction so that the indicator mark 48 is positioned to the right side. Consequently, by wearing the lens on the eyeball at a circumferential position with the indicator mark 48 positioned towards the ear side (in the present embodiment, the normal position for the right eye or the reversed position for the left eye), the near optical zone 24 can be positioned towards the nasal side in both the left and right eyes, and the first and second stable states can be consistently brought about.

In the contact lens 10 constructed in this manner, by employing slab-off zones 40, 42 and thicker portions 44, 46 having prescribed shapes such that the lens as a whole inclusive of the optical zone 14 and the peripheral zone 16 is axisymmetric in shape in relation to the symmetrical meridian 22 but non-axisymmetric in shape in relation to the orthogonal meridian 34, it is possible to establish a first stable state and a second stable state in which the lens is tilted by a prescribed tilt angle: $\gamma_1$, $\delta_1$. Thus, regardless of whether the lens is worn in the left or right eye, it is possible for the near optical zone 24 to be positioned towards the wearer's nose and towards the lower side. As a result, according to the contact lens 10 of the present embodiment, it is unnecessary to provide separate lenses for differentiated use in the left eye and the right eye, so the costs entailed in manufacture and administration can be reduced.

In particular, since a single lens can be used for both the left and right eyes, with a pair of lenses having a single specification, satisfactory vision correction for the right eye is afforded by the first stable state, while satisfactory vision correction for the left eye is afforded by the second stable state. Thus, the wearer having an identical prescription for the left and right eyes can handle lenses without having to be aware of left versus right distinctions, and ease of handling can be improved as well.

Figure 4:
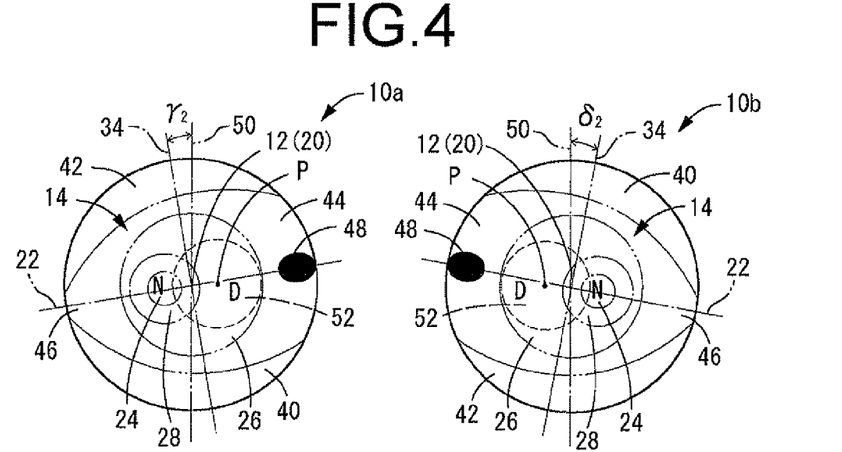
FIG. 4 is an illustration depicting another example of wearing combination of these contact lenses.

Moreover, the contact lens 10 of the present embodiment can be employed in two modes of wear in the same given eye, by flipping the lens vertically. Specifically, if the first and second stable states with the near optical zone 24 positioned towards the nasal side as depicted in FIG. 3 are designated as the normal orientation, the respective contact lenses 10a, 10b can be flipped vertically and worn in the same eye in reversed orientation as depicted in FIG. 4.

In the contact lens 10 of the present embodiment, because the slab-off zones 40, 42 are sloped, when the lens is worn in reversed orientation in the right eye, it becomes stably positioned at a circumferential position with the orthogonal meridian 34 tilted counterclockwise in the tilt direction opposite that of the first tilt angle: $\gamma_1$, by a prescribed tilt angle: $\gamma_2$ with respect to the vertical line 50 of the eye. On the other hand, when the lens is worn in reversed orientation in the left eye, it becomes stably positioned at a circumferential position with the orthogonal meridian 34 tilted clockwise in the tilt direction opposite that of the second tilt angle: $\delta_1$, by a prescribed tilt angle: $\delta_2$ with respect to the vertical line 50 of the eye. The first tilt angle: $\gamma_1$ and the prescribed tilt angle: $\gamma_2$, and/or the second tilt angle: $\delta_1$ and the prescribed tilt angle: $\delta_2$, may be equal to or different from one another.

In the contact lens 10 according to the present embodiment, the near optical zone 24 is positioned decentered from the optical zone geometric center axis 20, and thus regardless of whether the contact lens 10a is worn in reversed orientation in the right eye or the contact lens 10b is worn in reversed orientation in the left eye, the near optical zone 24 is positioned towards the ear side. The near optical zone 24 is thus positioned away from the center: P of the pupil 52, thereby affording modicum of near vision correction together with an effect comparable to a generally monofocal lens by the distance optical zone 26. Additionally, the occurrence of flare can be reduced considerably, making the lenses suitable for wear during night driving for example.

Figure 5:
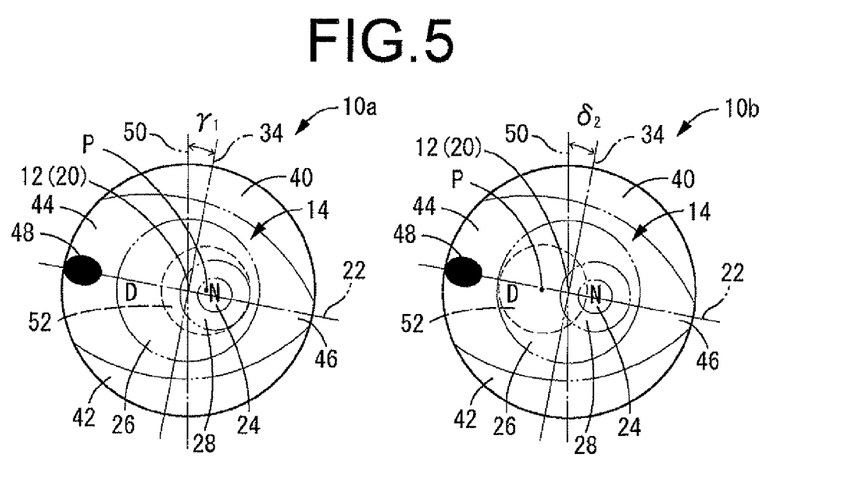
FIG. 5 is an illustration depicting yet another example of wearing combination of these contact lenses.

Additionally, while it is not essential for the contact lens 10 of the present embodiment to be provided as a left/right pair, by providing the lenses as a left/right pair and using them in various combinations of normal orientation and reversed orientation in both left and right eyes respectively, vision correction can be optimized according to usage conditions. Specifically, if the lenses are used in the normal orientation in both the left and right eyes as depicted in FIG. 3, satisfactory bifocal effect is achieved; whereas if the lenses are used in the reversed orientation in both the left and right eyes as depicted in FIG. 4, distance correction comparable to a monofocal lens can be achieved. It is additionally possible to wear a lens in normal orientation in the right eye and in reversed orientation in the left eye as depicted in FIG. 5. By so doing, in the right eye, the near optical zone 24 is close to the center: P of the pupil 52, affording both distance vision and near vision;

whereas in the left eye, the near optical zone 24 is away from the center: P of the pupil 52, affording distance correction comparable to a monofocal lens. The lenses are thus suited for use in modified monovision prescriptions.

Figure 6:
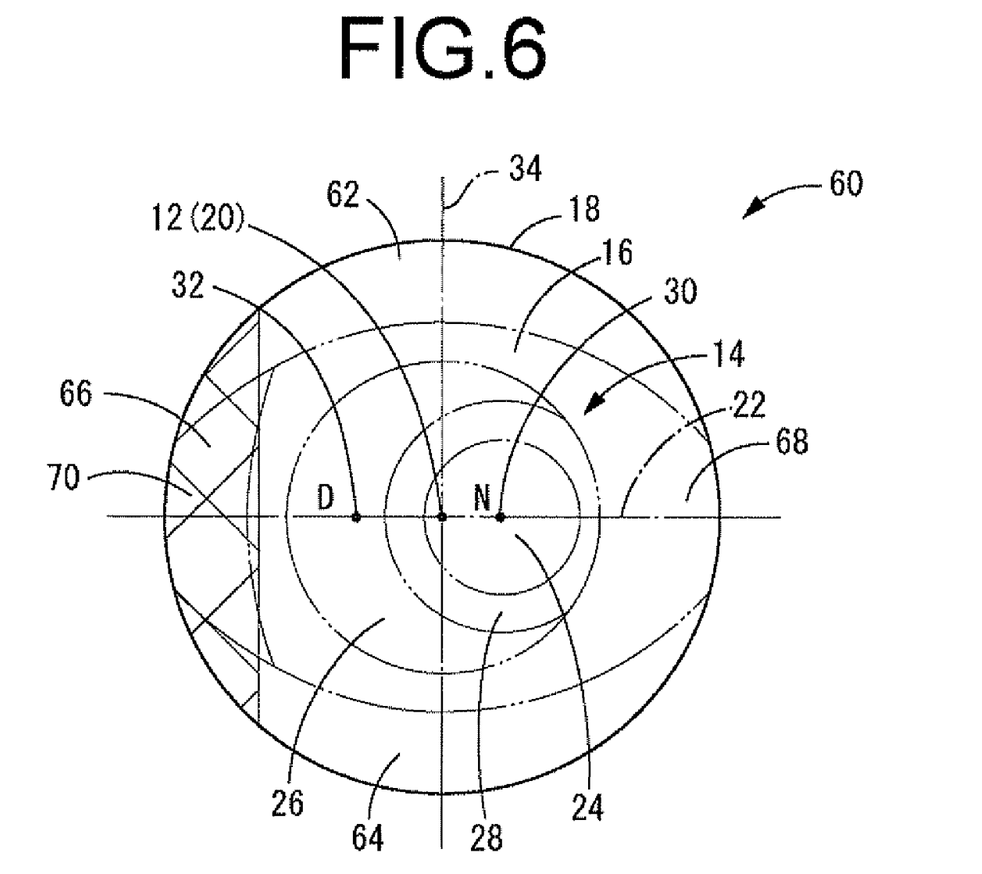
FIG. 6 is a front view of a contact lens according to a second embodiment of the present invention.

FIG. 6 depicts a contact lens 60 as a tilted-wear type contact lens according to a second embodiment of the present invention. In the description below, elements comparable in structure to those in the preceding first embodiment are assigned the same drawing symbols as in the first embodiment and are not described in any detail.

Like the tilted-wear type contact lens of the preceding first embodiment, the contact lens 60 is a simultaneous vision corrective lens having a near optical zone 24, a distance optical zone 26, and a transition zone 28 formed in the optical zone 14. The near zone superficial center 30 and the distance zone superficial center 32 are positioned decentered from the optical zone geometric center axis 20 on the symmetrical meridian 22. In the present embodiment in particular, the near optical zone 24 is somewhat larger than in the first embodiment, and has size such that it extends as far as the optical zone geometric center axis 20.

Slab-off zones 62, 64 that are formed as thin portions thinner than the zones to either side of the optical zone 14 in the direction of the symmetrical meridian 22 are formed to either side of the optical zone 14 in the direction of the orthogonal meridian 34. In the present embodiment in particular, the two slab-off zones 62, 64 are symmetric in shape in relation to the symmetrical meridian 22, and are also axisymmetric in relation to the orthogonal meridian 34.

To one side of the optical zone 14 in the direction of the symmetrical meridian 22 (in the present embodiment, the left side in FIG. 6) in the peripheral zone 16 there is formed between the two slab-off zones 62, 64 a lightweight portion 66 of reduced lens thickness that extends from approximately the diametrical center section of the peripheral zone 16 to the lens outside edge. A heavyweight portion 68 of greater lens thickness than the lightweight portion 66 is thereby formed in a zone to the opposite side of the optical zone 14 from the lightweight portion 66 in the direction of the symmetrical meridian 22 (the right side in FIG. 6) of the peripheral zone 16. Here, the differential in average thickness dimension of the lightweight portion 66 and the heavyweight portion 68 in the lens radial direction is preferably established within a range between 0.01 and 0.15 mm, more preferably between 0.05 and 0.10 mm. If the average thickness dimension differential is less than 0.01 mm, the weight differential between the lightweight portion 66 and the heavyweight portion 68 is small enough that the two portions 66, 68 assume a state of equilibrium, making it difficult to stabilize the lens in a circumferential position with the orthogonal meridian 34 tilted. On the other hand, if the average thickness dimension differential is greater than 0.15 mm, the weight of the heavyweight portion 68 is excessively great in comparison with the lightweight portion 66, and the lens will tend to stabilize at a single circumferential position, making it difficult to selectively set up the two circumferential stable states, i.e. the first stable state and the second stable state.

An indicator mark 70 is formed in the peripheral zone 16 in the region thereof where the lightweight portion 66 has been formed. The indicator mark 70 is produced by dyeing in a region bounded by the lens outside edge and a boundary line that extends parallel to the orthogonal meridian 34 through the approximately central portion between the outside peripheral edge of the optical zone 14 and the lens outside edge viewed in the direction of the symmetrical meridian 22. In the drawing, the region where the indicator mark 70 has been formed is indicated by hatching in order to illustrate the shape of the lightweight portion 66 overlapping the indicator mark 70.

Figure 7:
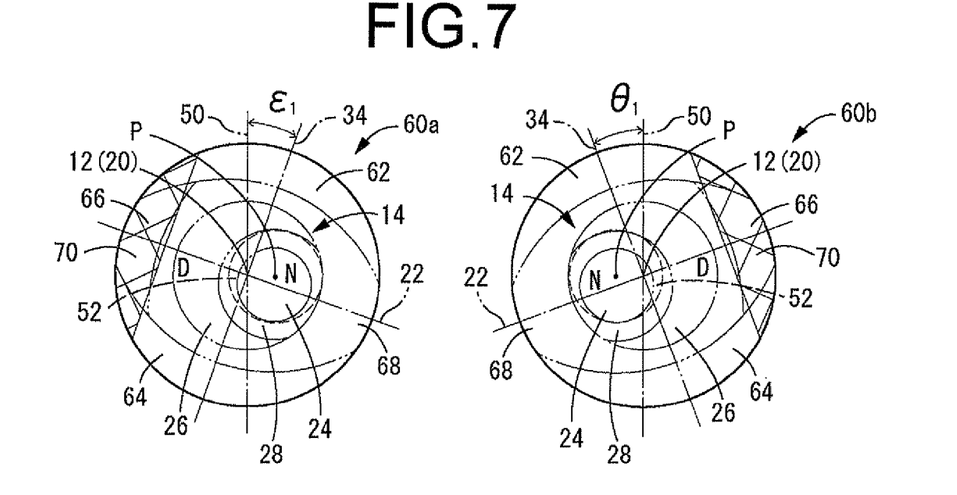
FIG. 7 is an illustration depicting one example of wearing combination of these contact lenses.

In the contact lens 60 according to the present embodiment, the circumferential positioning member includes the two slab-off zones 62, 64 and the heavyweight portion 68. Thus, as depicted in FIG. 7 for example, with the lens worn in the right eye, the lens is stably positioned in a first stable state tilted clockwise by a first tilt angle: $\epsilon_1$ with respect to the vertical line 50, while when worn in the left eye, the lens is stably positioned in a second stable state tilted counterclockwise by a second tilt angle: $\theta_1$ with respect to the vertical line 50. As a result, regardless of whether the lens is worn in the left or right eye, the near optical zone 24 can be positioned towards the nasal side and the lower side to obtain good bifocal effect. The first tilt angle: $\epsilon_1$ and the second tilt angle: $\theta_1$ may be the same or different from each other.

Figure 8:
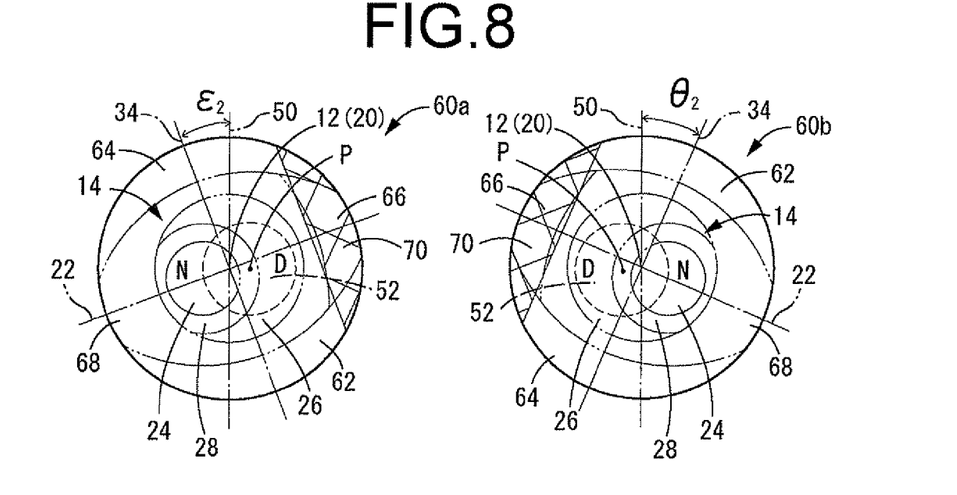
FIG. 8 is an illustration depicting another example of wearing combination of these contact lenses.

With the contact lens 60 according to the present embodiment as well, it is possible for the lens to be worn in reversed orientation inverted top to bottom with respect to normal orientation with the lens worn in the first or second stable state. For example, as depicted in FIG. 8, when worn in reversed orientation in the right eye, the lens becomes stably positioned at a circumferential position with the orthogonal meridian 34 tilted counterclockwise by a prescribed tilt angle: $\epsilon_2$ in the direction of opposite tilt from the first tilt angle: $\epsilon_1$, with respect to the vertical line 50. When worn in reversed orientation in the left eye on the other hand, the lens becomes stably positioned at a circumferential position with the orthogonal meridian 34 tilted clockwise by a prescribed tilt angle: $\theta_2$ in the direction of opposite tilt from the second tilt angle: $\theta_1$, with respect to the vertical line 50. Thus, in the contact lenses 60a, 60b worn in both the left and right eyes, the near optical zone 24 is positioned away from the center: P of the pupil 52 so as to obtain generally monofocal effect from the distance optical zone 26. The first tilt angle: $\epsilon_1$ and the prescribed tilt angle: $\epsilon_2$, and/or the second tilt angle: $\theta_1$ and the prescribed tilt angle: $\theta_2$, may be equal to or different from one another. While omitted from the drawing, it is possible as in the first embodiment for the lenses to be worn in combinations of normal orientation and reversed orientation in the left and right eyes respectively. For example, by wearing the lens in normal orientation in the right eye and in reversed orientation in the left eye, the lenses can be used advantageously for modified monovision prescriptions as well.

Thus, in the present embodiment as well, it is unnecessary to provide lenses for differentiated use in the left eye and the right eye, so the costs entailed in manufacture and administration can be reduced. Also, from the present embodiment it will be understood that no particular limitation is imposed on the specific structure of the circumferential positioning member for imparting a stable position in the lens circumferential direction.

Figure 9:
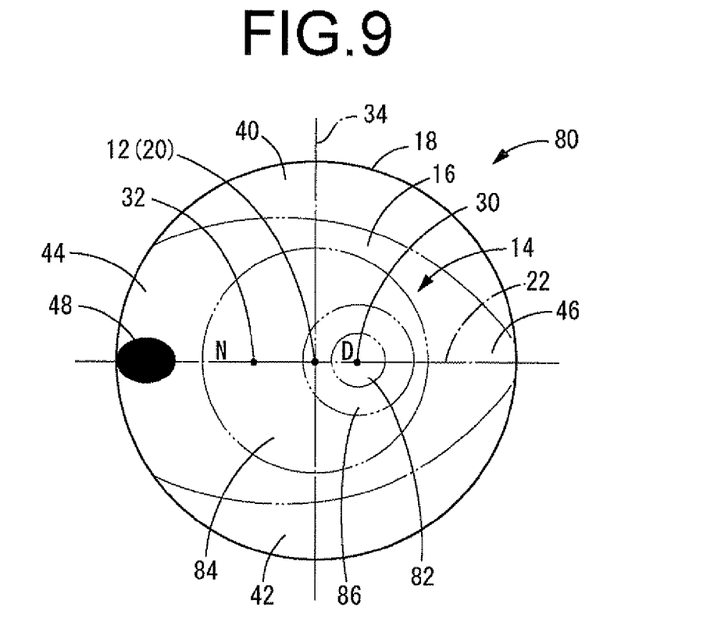
FIG. 9 is a front view of a contact lens according to a third embodiment of the present invention.

Next, FIG. 9 depicts a contact lens 80 as a tilted-wear type contact lens according to a third embodiment of the present invention. The near optical zone 24 and the distance optical zone 26 of the contact lens 10 according to the first embodiment described previously have been transferred, with equivalent contours in front view, to the contact lens 80, while exchanging the diopter powers thereof. Namely, in the present embodiment, a near optical zone 84 encircles a distance optical zone 82 of small circular shape in front view, and a transition zone 86 is formed between the distance optical zone 82 and the near optical zone 84. From the present embodiment it will be appreciated that the area ratio of the first diopter power region (the distance optical zone 82 in the present embodiment) and the second diopter power region (the near optical zone 84 in the present embodiment) is not limited in any way. Either the first and the second diopter power region may be large or small. The first and second diopter power regions may have equal area as well.

Figure 10:
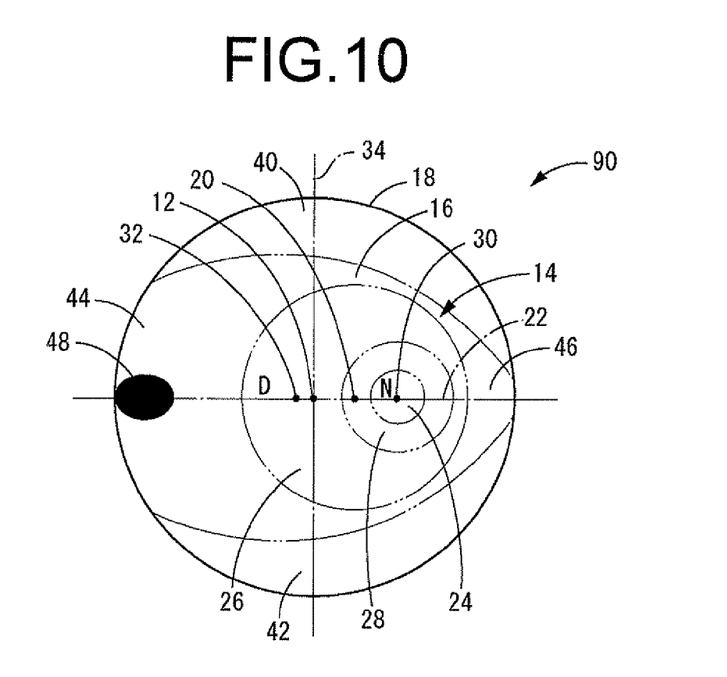
FIG. 10 is a front view of a contact lens according to a fourth embodiment of the present invention.

FIG. 10 depicts a contact lens 90 as a tilted-wear type contact lens according to a fourth embodiment of the present invention. In the present embodiment, the optical zone geometric center axis 20 is positioned decentered from the lens geometric center axis 12 on the symmetrical meridian 22. The optical zone 14 may be positioned decentered from the lens geometric center axis 12 in this way, to an extent such that no problems are encountered during wear.

While the present invention has been shown above through certain preferred embodiments, these are merely illustrative and should not be construed as limiting the invention in any way to the specific disclosure in the embodiments.

For example, the present invention is applicable to bifocal lenses having two focal points, to multifocal lenses having more than two focal points, and to progressive multi-focal lenses. In addition, the lens does not require a distinct boundary between the first diopter power region and the second diopter power region. In the case with a progressive multi-focal lens for example, for a median value lying between the maximum value and minimum value of lens diopter power, the region of smaller power than this median value constitutes the first diopter power region, and the region of greater power constitutes the second diopter power region. Accordingly, the present invention is not applicable exclusively to near/distance lenses for correcting presbyopia. By giving a lens a small power differential between the first diopter power region and the second diopter power region on the order of 0.25 D for example, it would be possible to provide a lens for use indoors in normal orientation, and for use outdoors in reversed orientation.

The decentered position of the superficial center of the first diopter power region or the second diopter power region is not strictly limited to one lying on the diametrical line, and a modicum of deviation from the diametrical line is permissible.

Moreover, the present invention is not limited to application in soft contact lenses, and is of course applicable to hard contact lenses.

Results of tests carried out for the purpose of demonstrating stable positioning and vision correction of tilted-wear type contact lenses constructed according to the present invention are presented below.

First, a tilted-wear type contact lens generally comparable in structure to that taught in the first embodiment, shown as an Example, and a contact lens of conventional structure, shown as a Comparative Example, were prepared for a human test subject A. Both lenses were soft contact lenses having outside diameter dimension (DIA) of 14.2 mm, a base curve (B.C.) of 8.60 mm, a rear surface optical zone diameter of 8 mm, a near optical zone diameter of 1 mm, a lens diopter power transition zone width of 0.5 mm, a center thickness of 0.10 mm, average thickness in the thicker portions in the peripheral zone of 0.40 mm, average thickness in the thin portions in the peripheral zone of 0.13 mm, and water content of 72%.

dation) to the near point of accommodation (the conjugate point on the retina at maximum strain of accommodation), expressed in terms of refractive power of the lens.

The tilted-wear type contact lens of the Example had a center angle of 50° for one thicker portion (the center angle: α of the thicker portion 44 in the contact lens 10 of the preceding first embodiment), a center angle of 10° for the other thicker portion (the center angle: β of the thicker portion 46 in the contact lens 10 of the preceding first embodiment), a decenter distance of 1.0 mm between the geometric center of the near optical zone and the lens geometric center in the lens for the right eye, and a decenter distance of 0.8 mm between the geometric center of the near optical zone and the lens geometric center in the lens for the left eye. In the peripheral zone, the indicator mark was formed by a blue tinted rectangular area 1.5 mm in length and 0.3 mm in width. For the decenter distance of the near optical zone geometric center from the lens geometric center, the decenter distance of the near optical zone geometric center from the lens geometric center during normal wear was selected as the optimal value for positioning the near optical zone geometric center at the pupil center.

Meanwhile, the contact lens of conventional design used as the Comparative Example had a center angle of 30° for both thicker portions (the center angles: α, β of the thicker portion 44 and the thicker portion 46 in the contact lens 10 of the preceding first embodiment), a decenter distance of 0.4 mm between the geometric center of the near optical zone and the lens geometric center in the lens for the right eye, and a decenter distance of 0.5 mm between the geometric center of the near optical zone and the lens geometric center in the lens for the left eye. In the peripheral zone, an indicator mark was formed by a blue tinted elliptical area with a 1.6 mm minor axis and a 2.0 mm major axis. For the decenter distance of the near optical zone geometric center from the lens geometric center, the decenter distance of the near optical zone geometric center from the lens geometric center at a circumferential position with the indicator mark positioned towards the ear side in front view (hereinafter termed Orientation 1) and at a circumferential position with the lens inverted top to bottom from Orientation 1 so that the indicator mark is positioned towards the nasal side in front view was selected as the optimal value for positioning the near optical zone geometric center at the pupil center.

Figure 11A:
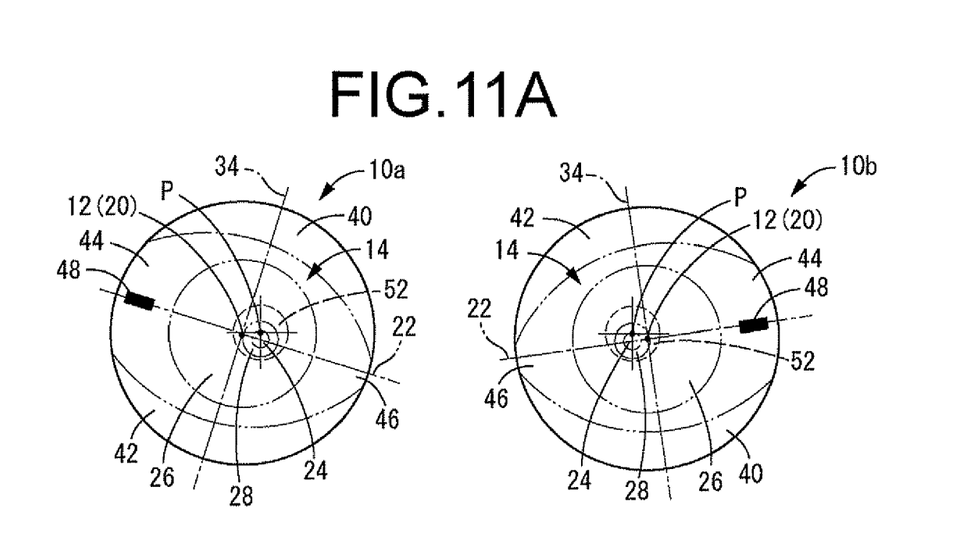
FIG. 11A is a front view depicting a normal orientation of an Example.
Figure 11B:
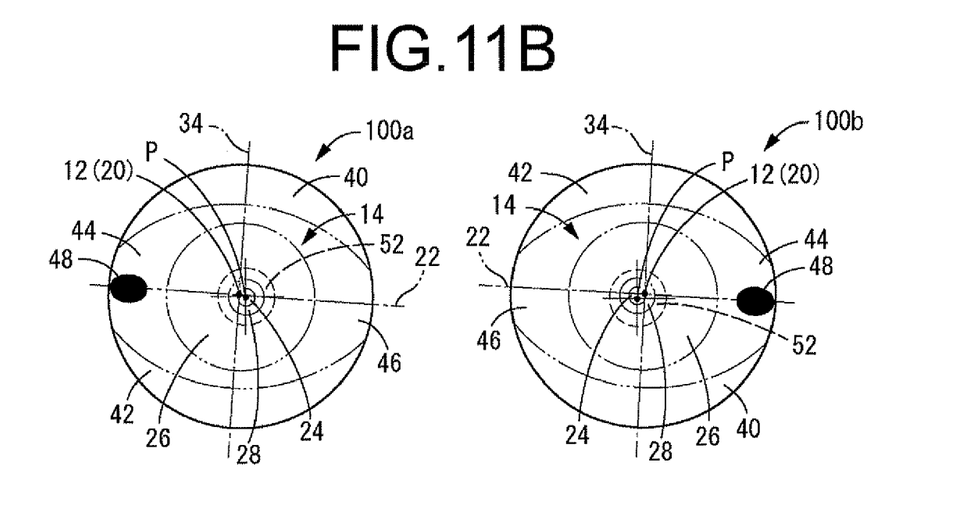
FIG. 11B is a front view depicting a first orientation of a Comparative Example.
Figure 12A:
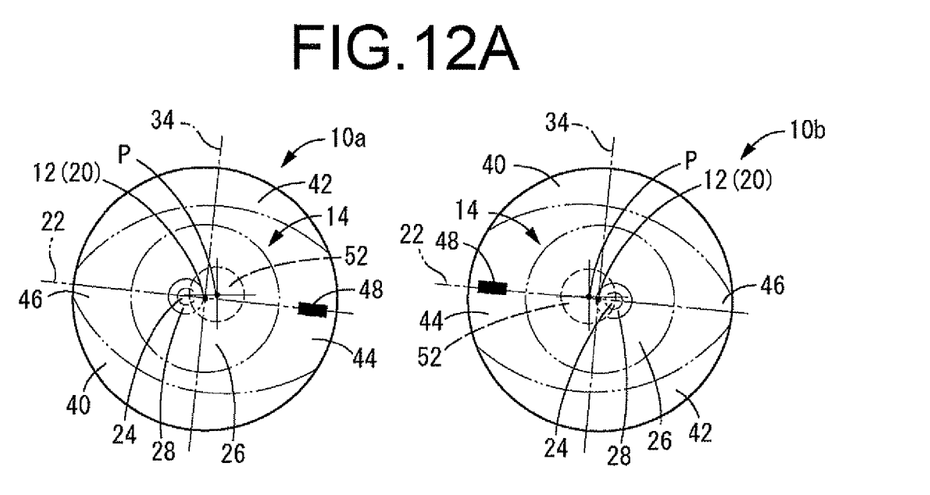
FIG. 12A is a front view depicting a reversed orientation of an Example.
Figure 12B:
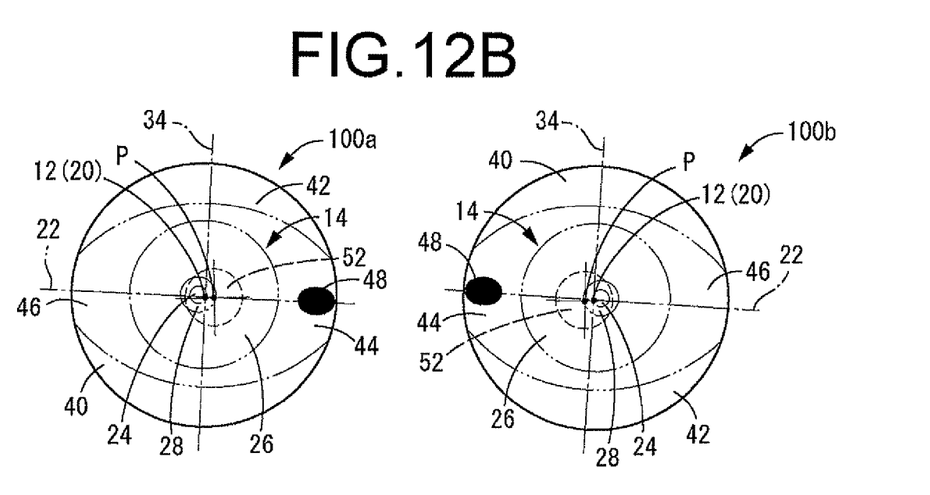
FIG. 12B is a front view depicting a reversed first orientation of a Comparative Example.

FIG. 11A and FIG. 11B depict the contact lens of the Example being worn in normal orientation in front view, and the contact lens of the Comparative Example being worn in Orientation 1 in front view, respectively. FIG. 12A and FIG. 12B depict the contact lens of the Example being worn in reversed orientation in front view, and the contact lens of the Comparative Example being worn while turned top to bottom

TABLE 1

| Subject | Age (years) | Accommodation ability (D) | Target eye (R/L) | Median corneal curvature ratio (mm) | CL power used Distance power (D) | Add power (D) |
|---|---|---|---|---|---|---|
| A | 44 | 4.0 | R | 8.13 | −3.00 | +1.50 |
|   |    |     | L | 8.16 | −2.25 | +1.50 |

In both the Example and the Comparative Example, the soft contact lenses described above were imparted with the distance power indicated in Table 1 to provide the test subject A with distance vision correction in both left and right eyes; both lenses were also imparted with uniform +1.5 D add power. The accommodation ability value in Table 1 represents the accommodation range from the far point of accommodation (the conjugate point on the retina at relaxed accommofrom Orientation 1 in front view, respectively. In FIGS. 11A and 12A, the contact lenses of the Example are depicted with that worn in the right eye and in the left eye designated as contact lens 10a and 10b respectively. In FIGS. 11B and 12B, the contact lenses of the Comparative Example are depicted with that worn in the right eye and in the left eye designated as contact lens 100a and 100b respectively. Elements of contact lenses 10*a*, 10*b*, 100*a*, 100*b* corresponding to the preceding first embodiment are assigned the same drawing symbols as in the first embodiment.

From FIGS. 11A, 11B and 12A, 12B and Tables 2 through 5, it will be apparent that the lens of the Example worn in the normal orientation can have greater bias of the near optical

TABLE 2

| Target eye (R/L) | Normal orientation | | Reversed orientation | |
|---|---|---|---|---|
| | Horizontal direction (mm) | Vertical direction (mm) | Horizontal direction (mm) | Vertical direction (mm) |
| R | −1.0 | −0.1 | −0.6 | −0.2 |
| L | −0.8 | −0.3 | −0.5 | −0.1 |
| Ave. | −0.9 | −0.2 | −0.6 | −0.2 |

TABLE 3

| Target eye (R/L) | Orientation 1 | | Inverted orientation of Orientation 1 | |
|---|---|---|---|---|
| | Horizontal direction (mm) | Vertical direction (mm) | Horizontal direction (mm) | Vertical direction (mm) |
| R | 0.4 | 0.1 | −0.6 | 0.1 |
| L | −0.5 | 0.1 | −0.4 | 0.2 |
| Ave. | −0.5 | 0.1 | −0.5 | 0.2 |

TABLE 4

| Target eye (R/L) | Normal orientation | | Reversed orientation | |
|---|---|---|---|---|
| | Horizontal direction (mm) | Vertical direction (mm) | Horizontal direction (mm) | Vertical direction (mm) |
| R | 0.0 | −0.4 | −1.6 | −0.1 |
| L | 0.0 | −0.4 | −1.3 | −0.2 |

TABLE 5

| Target eye (R/L) | Orientation 1 | | Inverted orientation of Orientation 1 | |
|---|---|---|---|---|
| | Horizontal direction (mm) | Vertical direction (mm) | Horizontal direction (mm) | Vertical direction (mm) |
| R | 0.0 | −0.1 | −1.0 | 0.1 |
| L | 0.0 | 0.1 | −1.0 | 0.1 |

The distance of the lens geometric center axis 12 from the pupil center: P when the contact lenses 10*a*, 10*b* of the Example are worn in normal orientation and in reversed orientation is given in Table 2. The distance of the lens geometric center axis 12 from the pupil center: P when the contact lenses 100*a*, 100*b* of the Comparative Example are worn in Orientation 1 and while inverted top to bottom from Orientation 1 is given in Table 3. The distance of the near zone superficial center 30 from the pupil center: P when the contact lenses 10*a*, 10*b* of the Example are worn in normal orientation and in reversed orientation is given in Table 4. The distance of the near zone superficial center 30 from the pupil center: P when the contact lenses 100*a*, 100*b* of the Comparative Example are worn in Orientation 1 and while inverted top to bottom from Orientation 1 is given in Table 5. In the Example and the Comparative Example, because the near optical zone 24 is circular-shaped in front view, the near zone superficial center 30 is the geometric center of the near optical zone 24. In Tables 2 to 5, for the horizontal direction, − denotes the ear side and + denotes the nasal side, while for the vertical direction + denotes upward and − denotes downward.

zone 24 relative to the pupil center: P than the lens of the Comparative Example when worn in Orientation 1. Accordingly, the near optical zone 24 can be situated at a position overlapping the pupil 52 and closer towards the lower nasal side than the Comparative Example, and it has been shown that bifocal effect by the near optical zone 24 and the distance optical zone 26 is more advantageously achieved.

For the lens of the Comparative Example, between wear in Orientation 1 and wear in the inverted orientation of Orientation 1, there is substantially no difference in the extent of bias of the lens geometric center axis 12 and the near zone superficial center 30 from the pupil center: P; whereas according to the Example, between the normal orientation and the reversed orientation there is large variation in the extent of bias of the lens geometric center axis 12 and the near zone superficial center 30 from the pupil center: P. Thus, as compared with the Comparative Example, when the lens of the Example is worn in the reversed orientation, the near optical zone 24 can be situated at a position further away from the pupil center: P, and it has been shown that effects comparable to a generally monofocal lens can be obtained from the distance optical zone 26.

TABLE 6

| | Example | | Comparative Example | |
| --- | --- | --- | --- | --- |
| Target eye (R/L) | Normal orientation (Deg) | Reversed orientation (Deg) | Orientation 1 (Deg) | Inverted orientation (Deg) |
| R | −17.2 | −5.8 | −3.8 | −2.5 |
| L | −8.4 | 5.8 | 3.2 | 4.0 |
| Ave. | −12.8 | 0.0 | −0.3 | 0.8 |

Measurements of lens tilt taken with the lens of the Example in normal orientation and reversed orientation, and with the lens of the Comparative Example in Orientation 1 and inverted orientation, are given in Table 6. Designating the orientation with the indicator mark 48 horizontal as 0°, for the right eye, lens tilt in the counterclockwise direction is denoted by +; and for the left eye, lens tilt in the clockwise direction is denoted by +.

From Table 6 it will be understood that for the Comparative Example, when the lens is worn in Orientation 1, for the left eye the lens is biased towards the + direction, that is, with the near optical zone 24 biased in a direction away from the lower nasal side of the pupil 52; whereas according the Example, when worn in normal orientation, the lens is biased towards the minus direction, that is, the direction situated to the lower nasal side of the pupil 52, in both the left and right eyes. Also, when worn in the normal orientation, lens tilt of the lens of the Example is greater in comparison with the Comparative Example. This demonstrates that according to the Example, through wear in the normal orientation the near optical zone 24 is positioned more advantageously to the lower nasal side of the pupil 52.

TABLE 7

| | Normal orientation in both eyes (Orientation 1 in both eyes) | | Reversed orientation in both eyes (Inverted orientation in both eyes) | |
| --- | --- | --- | --- | --- |
| | Distance | Near | Distance | Near |
| Example | 9 | 9 | 10 | 2 |
| Comparative Example | 8 | 8 | 9 | 3 |

Evaluations based on self-reported impressions by a test subject in relation to distance vision and near vision while wearing the lenses of the Example and of the Comparative Example in the normal orientation or Orientation 1 in both eyes, and when wearing them in the reversed orientation or inverted orientation of Orientation 1 in both eyes, respectively, are given in Table 7. Vision was evaluated in 11 levels of 0 to 10, with 10 being the best.

From Table 7 it will be appreciated that the lens of the Example, when worn in the normal orientation, affords distance vision correction and near vision correction that are both more effective as compared with the lens of the Comparative Example when worn in Orientation 1; and correction is well balanced for distance and near vision. When worn in the reversed orientation, the lens of the Example affords stronger distance vision correction and weaker near vision correction as compared with the lens of the Comparative Example when worn in inverted orientation of Orientation 1, demonstrating distance vision correction generally comparable to a monofocal lens.

TABLE 8

| | Normal orientation in both eyes (Orientation 1 in both eyes) (D) | Reversed orientation in both eyes (Inverted orientation in both eyes) (D) |
| --- | --- | --- |
| Example | 1.69 | 0.20 |
| Comparative Example | 1.34 | 0.58 |

Measurements of add power obtained during lens wear when the lenses of the Example and the Comparative Example were worn in both eyes in the normal orientation or Orientation 1, and when worn in both eyes in the reversed orientation or inverted orientation of Orientation 1, respectively, are given in Table 8. From Table 8 it will be appreciated that the lens of the Example worn in the normal orientation affords higher add power, i.e. more effective near vision correction, as compared with the lens of the Comparative Example when worn in Orientation 1. When the lens of the Example is worn in the reversed orientation, near vision correction is weaker as compared with the lens of the Comparative Example when worn in inverted orientation of Orientation 1, demonstrating distance vision correction generally comparable to a monofocal lens.

The invention claimed is:

1. A tilted-wear type contact lens, comprising:
an optical zone situated in a lens center section, and provided with a first diopter power region and a second diopter power region having a lens diopter power that is more positive than that of the first diopter power region, wherein the contact lens has a lens profile that is axisymmetric with respect to a symmetrical meridian defined by one diametrical line of the optical zone, wherein a superficial center of at least one of the first diopter power region and the second diopter power region is decentered on the symmetrical meridian against a geometric center of the optical zone, wherein a circumferential positioning member is provided to afford stable positions in a lens circumferential direction when worn in an eye, wherein an orthogonal meridian that is orthogonal to the symmetrical meridian is tilted by a prescribed angle with respect a vertical line of the eye, wherein the circumferential positioning member is adapted to give rise to a first stable state in which, with the lens placed in a right eye, the orthogonal meridian is tilted by a first tilt angle in the circumferential direction relative to the vertical line of the eye, and to a second stable state in which, with the lens placed in a left eye with an orientation thereof flipped vertically from that when worn in the right eye, the orthogonal meridian is tilted relative to the vertical line of the eye by a second tilt angle to an opposite side in the circumferential direction from the first tilt angle, and wherein a visible indicator mark is provided for identifying normal position and flipped position in relation to the orientation in a lens vertical direction.

2. The tilted-wear type contact lens according to claim 1, further comprises a peripheral zone disposed to an outer peripheral side of the optical zone, wherein the circumferential positioning member comprises two slab-off zones provided on respective portions of the peripheral zone located at opposite sides of the optical zone in a direction of the orthogonal meridian, the two slab-off zones are made thinner than portions located at opposite sides of the optical zone in a direction of the symmetrical meridian, and the two slab-off zones are axisymmetric with respect to the symmetrical meridian and non-axisymmetric with respect to the orthogonal meridian.

3. The tilted-wear type contact lens according to claim 2, wherein a pair of thicker portions of mutually different circumferential length are provided between two circumferential end portions of a pair of thinner portions reduced in thickness by the two-slab off zones, and are located at opposite sides of the optical zone in the direction of the symmetrical meridian.

4. The tilted-wear type contact lens according to claim 1, further comprising a peripheral zone disposed to an outer peripheral side of the optical zone, wherein the circumferential positioning member is provided in the peripheral zone such that a portion situated to one side of the optical zone in a direction of the symmetrical meridian is thicker in comparison with a portion situated to another side.

5. The tilted-wear type contact lens according to claim 1, further comprising a peripheral zone disposed to an outer peripheral side of the optical zone, wherein the indicator mark is provided on the peripheral zone by at least one of dyeing and engraving.

6. The tilted-wear type contact lens according to claim 1, wherein the geometric center of the optical zone is coincident with a lens geometric center.

7. The tilted-wear type contact lens according to claim 1, wherein the superficial center of at least one of the first diopter power region and the second diopter power region is decentered from the geometric center of the optical zone by a distance of 0.4 mm or greater on the symmetrical meridian.

8. The tilted-wear type contact lens according to claim 1, wherein, on a lens posterior surface adapted to be superposed on a cornea, a peripheral zone is disposed to an outer peripheral side of the optical zone, and an outside diameter dimension of the optical zone does not exceed 75% of an outside diameter dimension of the lens.

9. The tilted-wear type contact lens according to claim 8, wherein the lens is a soft contact lens; and the outside diameter dimension of the optical zone of the lens posterior surface is 10 mm or less.

10. The tilted-wear type contact lens according to claim 1, wherein a power-added surface that imparts an additional lens diopter power to the second diopter power region of the optical zone is provided on a lens posterior surface adapted to be superposed on a cornea during wear.

11. The tilted-wear type contact lens according to claim 2, wherein the lens is a soft contact lens, and the two slab-off zones are provided on a lens posterior surface adapted to be superposed on a cornea during wear.

12. The tilted-wear type contact lens according to claim 1, wherein the circumferential positioning member is adapted to selectively set up a normal orientation in which the lens is worn in either of the first stable state and the second stable state, and a reversed orientation in which the first diopter power region and the second diopter power region that are respectively positioned to either of left and right sides of the eye in the normal orientation are instead positioned oppositely to another of left and right sides, respectively.

* * * * *